July 29, 1952　　　A. G. SHERMAN ET AL　　　2,604,671
TENT ATTACHMENT FOR MOTOR VEHICLES Filed May 12, 1947　　　　　　　　　　5 Sheets-Sheet 1

INVENTORS
ARTHUR G. SHERMAN
ARTHUR G. SHERMAN JR.
GEORGE H. SHERMAN
BY
*J. S. Murray*
ATTORNEY July 29, 1952 A. G. SHERMAN ET AL 2,604,671
TENT ATTACHMENT FOR MOTOR VEHICLES
Filed May 12, 1947 5 Sheets-Sheet 2

INVENTORS
ARTHUR G. SHERMAN
ARTHUR G. SHERMAN JR.
GEORGE H. SHERMAN
BY
J.S. Murray
ATTORNEY July 29, 1952     A. G. SHERMAN ET AL     2,604,671
TENT ATTACHMENT FOR MOTOR VEHICLES
Filed May 12, 1947     5 Sheets-Sheet 3

*INVENTORS*
ARTHUR G. SHERMAN
ARTHUR G. SHERMAN JR.
GEORGE H. SHERMAN
BY
J. S. Murray
ATTORNEY July 29, 1952         A. G. SHERMAN ET AL         2,604,671
                 TENT ATTACHMENT FOR MOTOR VEHICLES
Filed May 12, 1947                              5 Sheets-Sheet 4

INVENTORS
ARTHUR G. SHERMAN
ARTHUR G. SHERMAN JR.
GEORGE H. SHERMAN
BY
J.S. Murray
ATTORNEY

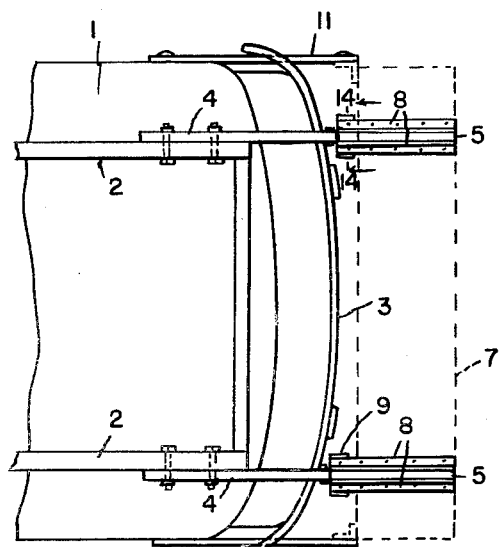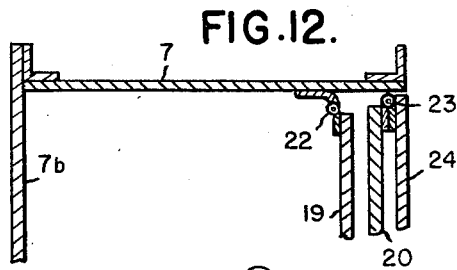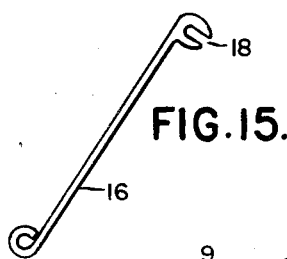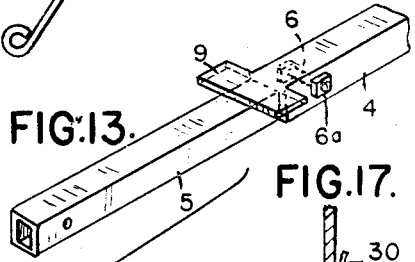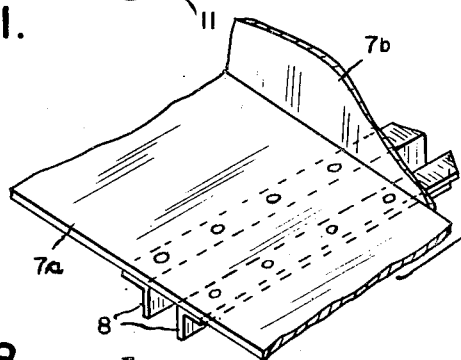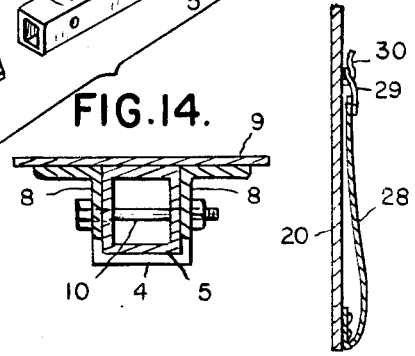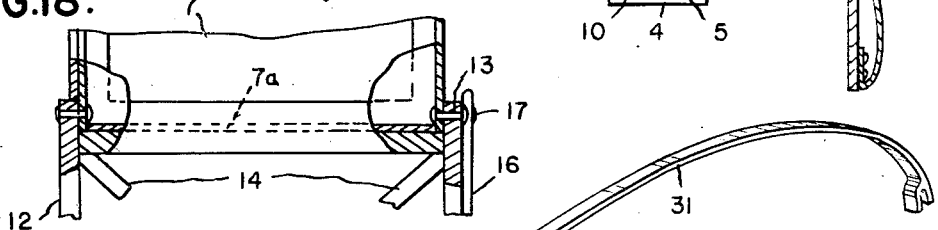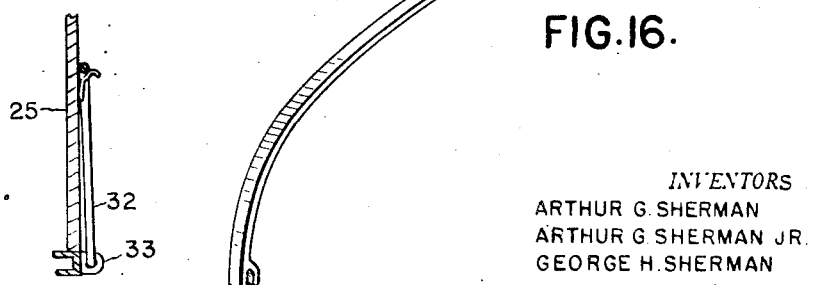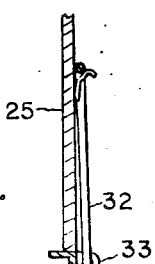

Patented July 29, 1952

2,604,671

UNITED STATES PATENT OFFICE 2,604,671

TENT ATTACHMENT FOR MOTOR VEHICLES

Arthur G. Sherman, Arthur G. Sherman, Jr., and George H. Sherman, Detroit, Mich.

Application May 12, 1947, Serial No. 747,482

5 Claims. (Cl. 20—2)

This invention relates to tent attachments for motor vehicles and particularly tent attachments suited to be compactly carried upon and behind a motor vehicle in transit, and rearwardly expansible to a use position.

An object of the invention is to attach to the rear of a motor vehicle a housing to receive a collapsed tent structure, such housing having front and rear walls, and these serving as the same walls of the tent structure as extended for use.

Another object is to provide improved means for quickly securing a tent attachment to and detaching it from a motor vehicle.

Another object is to form each side wall of a motor vehicle tent attachment of substantially rigid, hingedly connected panels, collapsible into parallelism for effecting compact storage of the attachment.

Another object is to provide a motor vehicle tent attachment, comprising end and side walls spaced above the ground, similarly to the vehicle body, and to equip such walls with a freely flexible skirt such as may be stored between the walls when the tent attachment is collapsed, and forming a downward extension of the walls in use of the attachment.

Another object is to equip an attachment of the described character with leg members pivotally adjustable from lowered positions of use to raised storage positions, and comprising handle members to facilitate carrying the attachment and mounting it on or dismounting it from a motor vehicle.

Another object is to provide a motor vehicle tent attachment which, when expanded, will form a complete structure independent of and readily separable from the vehicle, so that use of the vehicle may be had without interference with use of the tent structure.

Another object is to provide a collapsible tent attachment for motor vehicles, comprising a housing receiving the collapsed attachment and further receiving a full sized bed and its bedding in the collapsed position of the attachment, whereby the bed is ready for immediate occupancy when the attachment is extended.

These and various other objects are attained by the construction hereinafter described and illustrated in the accompanying drawings, wherein:

Fig. 11 is a fragmentary bottom view of a vehicle and of our attachment applied to such vehicle.

Fig. 12 is an enlargement of a portion of Fig. 6.

Fig. 13 is a fragmentary perspective view showing one of two duplicate provisions for mounting our attachment on a vehicle.

Fig. 14 is a cross sectional detail of one of said provisions, taken on the line 14—14 of Fig. 11.

Fig. 15 is a detail view of a brace rod.

Fig. 16 is a perspective detail of a bow member for engaging the flexible roof of the expanded tent structure.

Fig. 17 is a vertical sectional detail of one of the side panels showing how an attached flexible skirt may be held in a raised position.

Fig. 18 is a detail elevational view of a leg member, partially in section to show pivot means.

Fig. 19 is a fragmentary vertical cross section of the tent structure door, showing how the rear supporting leg of such structure is stored against the door, when not in use.

Figure 1:
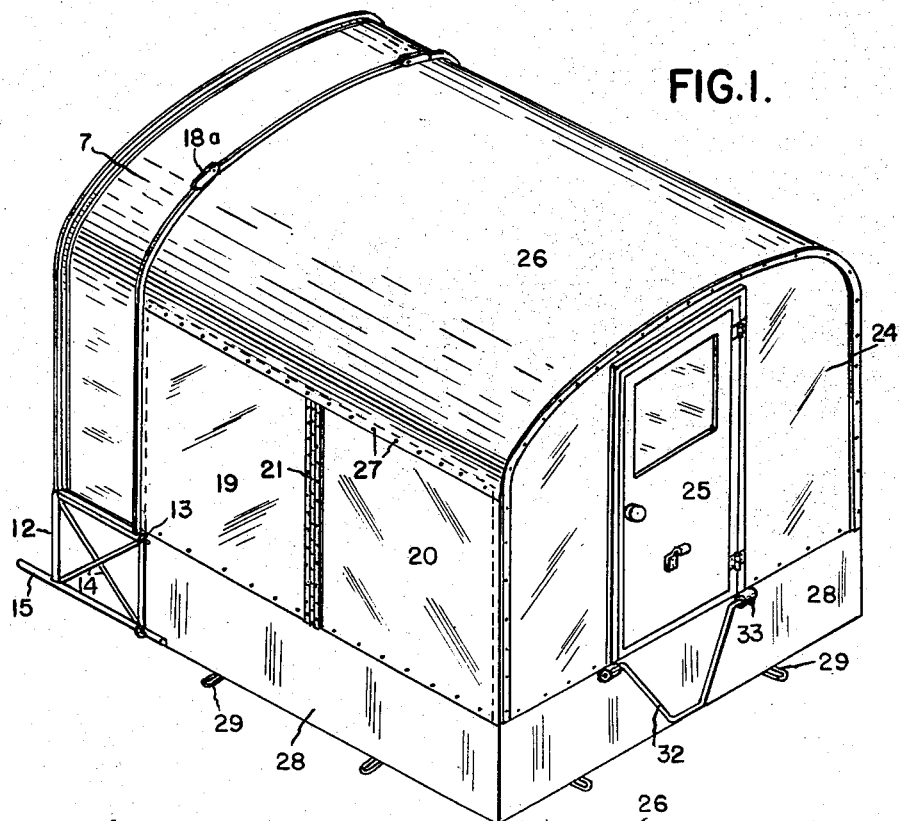
Fig. 1 is a perspective view of our tent attachment, as expanded for use.
Figure 2:
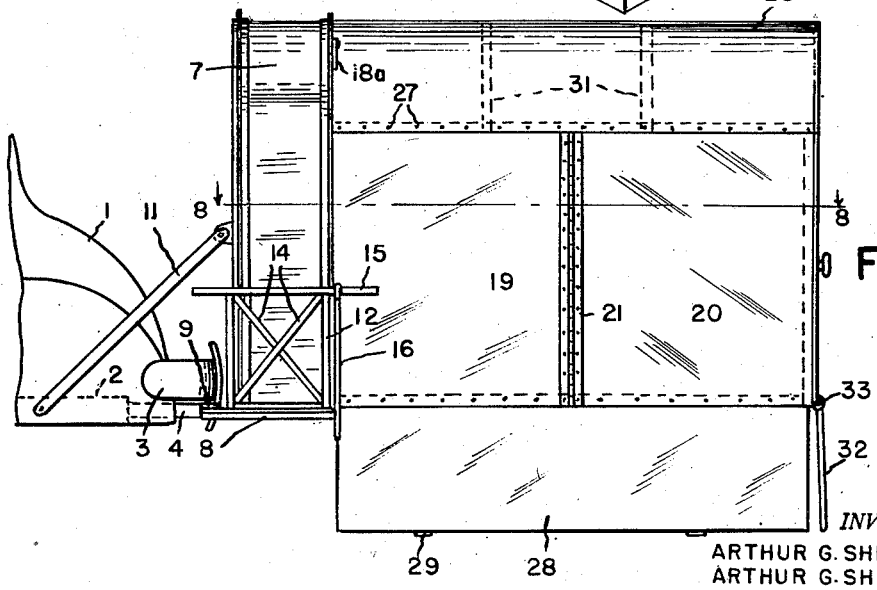
Fig. 2 is a side elevational view of the expanded attachment, showing its normal relation to a motor vehicle.

In these views, the reference character 1 designates an ordinary motor vehicle body, surmounting the usual frame 2 and equipped with the usual rear bumper 3. Clamped to said frame, at opposite sides thereof (see Fig. 11), are a pair of bars 4, preferably of square tubing, which project rearwardly from the frame and terminate in proximity to the rear bumper. Slidably carried by and fitted in the bars 4 are a pair of bars 5, also preferably square and tubular, which may be fully inserted in the bars 4 except when serving as supports for our attachment. In so serving, the bars 5 project rearwardly about a foot beyond the bars 4, a bolt 6 and nut 6a being employed to retain each bar 5 in either described relation to the corresponding bar 4. Our attachment comprises a housing 7 formed of sheet aluminum or other sheet material, and having a flat bottom 7a, side walls and a roof of an arched construction, and a front wall 7b. The wall 7b preferably has a window 7c centrally located in its upper portion. To the under face of the bottom 7a are rigidly secured two pairs of spaced angle bars 8, each such pair being adapted to straddle one of the supports 5 when the housing 7 is properly mounted on said supports. Said angle bars project forwardly a few inches beyond the housing 7 for engagement beneath plates 9 welded or otherwise rigidly secured to the rear ends of the bars 4 and projecting rearwardly and also laterally from the latter (see Fig. 13). Thus any rearward tilting of the housing 7 is prevented. The housing is further secured on the bars 5 by bolts 10, respectively inserted through the respective pairs of angle bars 8 and corresponding bars 5. While the attachment means so far described will readily withstand stresses normally encountered, it is preferred to connect the housing 7 still more securely to the vehicle by extending brace rods 11 forwardly and downwardly from the sides of said housing to the rear fenders or some other part of the vehicle.

Figure 3:
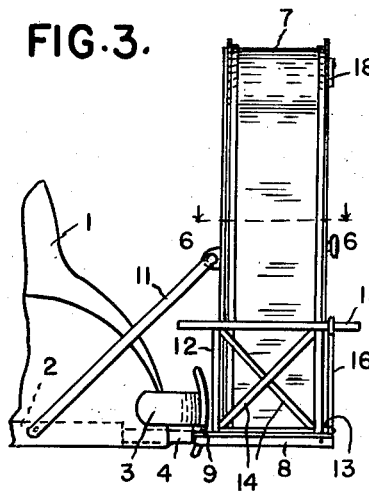
Fig. 3 is a side view showing the attachment in collapsed form and fully carried by the motor vehicle.
Figure 4:
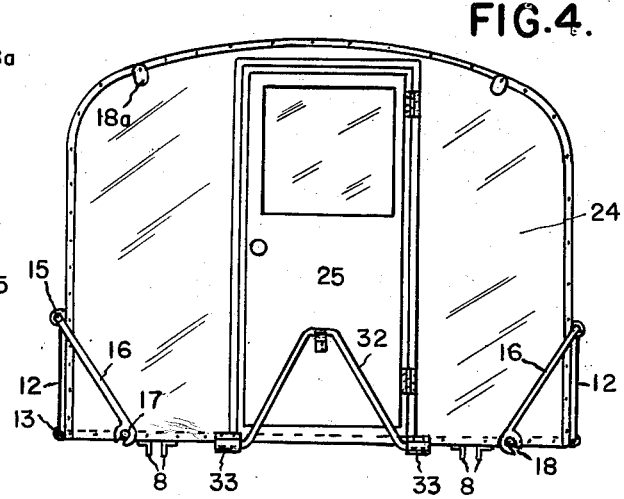
Fig. 4 is a rear view of the collapsed attachment.
Figure 5:
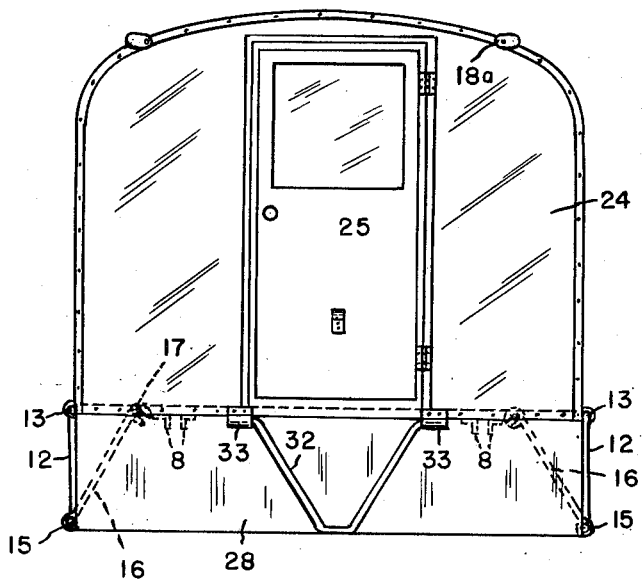
Fig. 5 is a rear view of the expanded attachment.

The housing 7 is equipped with a pair of leg members 12, best seen in Fig. 18, and may thus be supported at its intended elevation above the ground, when detached from the vehicle. These leg members are pivoted to the housing as indicated at 13, to swing up and against the sides of the housing when the attachment is to be fully carried by the vehicle 1, as appears in Fig. 3. Each leg member comprises an open rectangular frame reinforced by crossed diagonal struts 14, and the ground-engaging bar of each such frame projects sufficiently forwardly and rearwardly beyond the leg uprights to form a pair of handles 15. When the leg structures are in their raised positions, said handles facilitate carrying the housing to or from a motor car and lifting it on or off of the bars 5. On the rear handle 15 of each leg member is pivoted one end of a brace rod 16. When the leg members are in their lowered or use positions, the brace rods 16 extend diagonally upward (Fig. 5) to engage headed pins 17 on the housing bottom in slots 18 formed in the other ends of said brace rods. This serves to positively hold the leg members vertically disposed. In the raised or stored positions of the leg members, the brace rods 16 extend diagonally downward (Fig. 4) to again engage the pins 17. When thus positioned, said rods maintain the legs in their raised position and additionally prevent rearward expansion of a tent structure collapsed within the housing 7, as will now be described. As a further safeguard against accidental escape of the collapsed tent structure from the housing 7, a pair of latch elements 18a are pivoted on the housing roof so that they may obstruct the open rear end of the housing, when desired.

Each side wall of the collapsible tent structure is formed by a pair of duplicate rectangular panels 19 and 20, of plyboard or the like, having a hinged interconnection 21 at adjoined vertical edges thereof, and having their other vertical edges hinged respectively at 22 to the corresponding side wall of the housing 7 and at 23 to the corresponding lateral margin of a rear wall 24. Said rear wall is formed of aluminum or other suitable sheet material and is centrally fitted with a door 25 having the customary hinges, latch (not shown), and handle. The hinges 22 are interiorly mounted on the housing, being sufficiently spaced forward from the open rear end of the housing to permit the collapsed panels and wall 24 to occupy the rear portion of the housing, as best appears in Fig. 6. The top 26 of the collapsible tent structure is formed of waterproofed flexible sheet material secured at its rear edge to the curved upper edge of the wall 24, having its lateral margins secured to the panels 19 and 20, and having its forward edge secured to and within the domed top of the housing 7. The securing means may be rivets 27 or other suitable fastenings. The structure further comprises a skirt 28 of flexible sheet material preferably waterproofed and secured to the lower margins of the wall 24, panels 19 and 20, and to the rear margin of the housing floor 7a. Preliminary to any collapsing of the tent structure, said skirt is lifted so as to extend upwardly on the interior faces of the rear wall and side panels, being so held by loops 29 on said skirt engaging hooks 30 on said wall and panels. To avoid material sagging of the flexible top when expanded, several bow members 31 (see Fig. 16) are engaged with such top, in a suitably spaced relation, the ends of such members being forked to detachably straddle the panels. The bow members further resist any tendency of the panels to collapse inwardly due to wind or other pressure, or to tension applied to the flexible roof and skirt.

Figure 6:
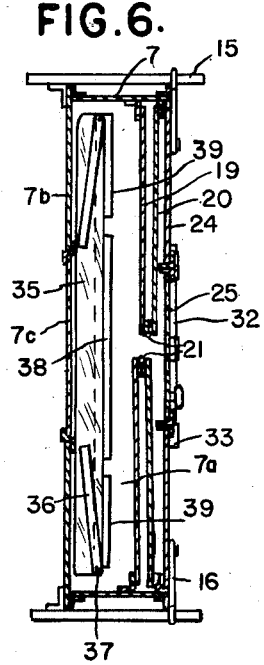
Fig. 6 is a horizontal sectional view of the collapsed attachment, taken on the line 6—6 of Fig. 3.
Figure 7:
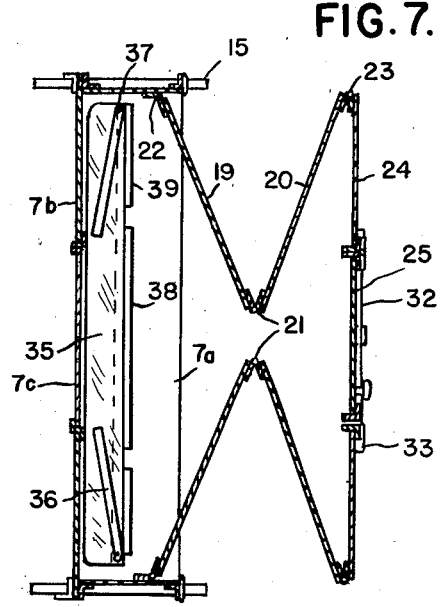
Fig. 7 is a similar view but showing the attachment partially expanded.
Figure 8:
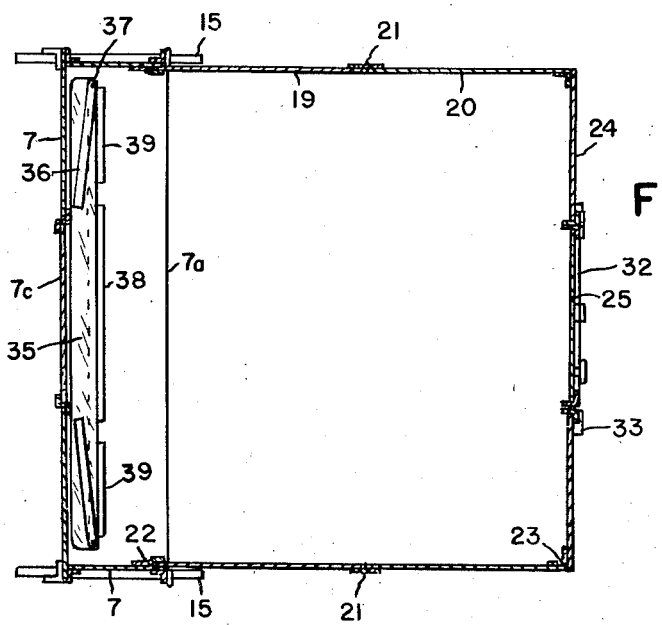
Fig. 8 is a horizontal sectional view of the fully expanded attachment, taken on the line 8—8 of Fig. 2.

It will be apparent from the preceding description that upon removal of the bow members 31 and applying inward pressure to the panels at the hinge 21, the panels will collapse inwardly and the wall 24 will be shifted forwardly, until eventually said panels and wall occupy the parallel relation shown in Fig. 6 within the housing 7. Thus the wall 24 serves the dual purpose of closing the rear end of the housing when the tent structure is stored therein and of closing the rear end of such structure as expanded for use. The flexible top collapses or expands as the panels are collapsed or expanded and primarily occupies the top portion of the housing 7, when collapsed. The skirt, since it is upwardly lapped on the panels prior to their collapse, is accurately guided by the panels to a collapsed position. The hinges 21, 22, and 23 are preferably of a piano or continuous type, and so connect the panels with each other and with the housing and rear wall that the housing may serve to support the entire expanded structure. This, however, would impose severe stresses on the housing and hinges, and it is preferred to pivot an approximately V-shaped leg 32 in brackets 33 at the lower margin of the wall 24 and at opposite sides of the doorway so that such leg, when lowered, provides a rear support, and may be raised to lie exteriorly against the door. Said leg, furthermore, when swung rearwardly from the wall 24 provides a convenient handle for use in expanding the tent structure rearwardly.

Figure 9:
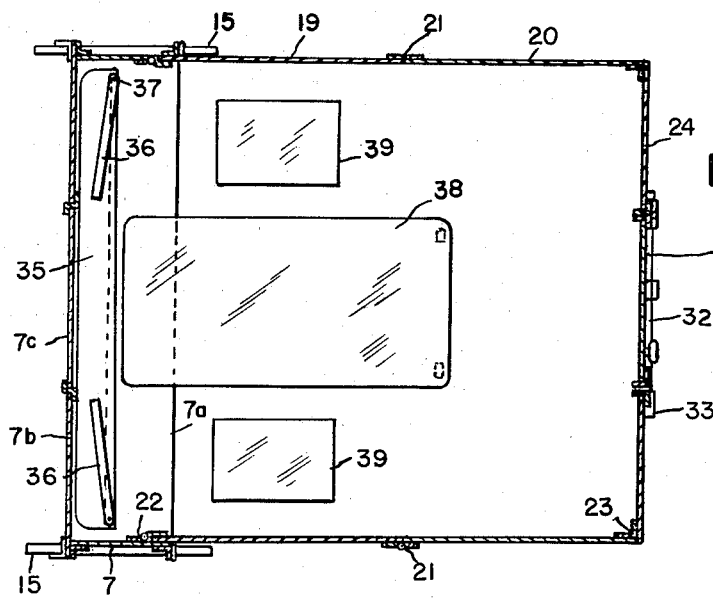
Fig. 9 is a sectional view similar to Fig. 8, but showing the use position of a table and chairs which are a feature of the attachment.
Figure 10:
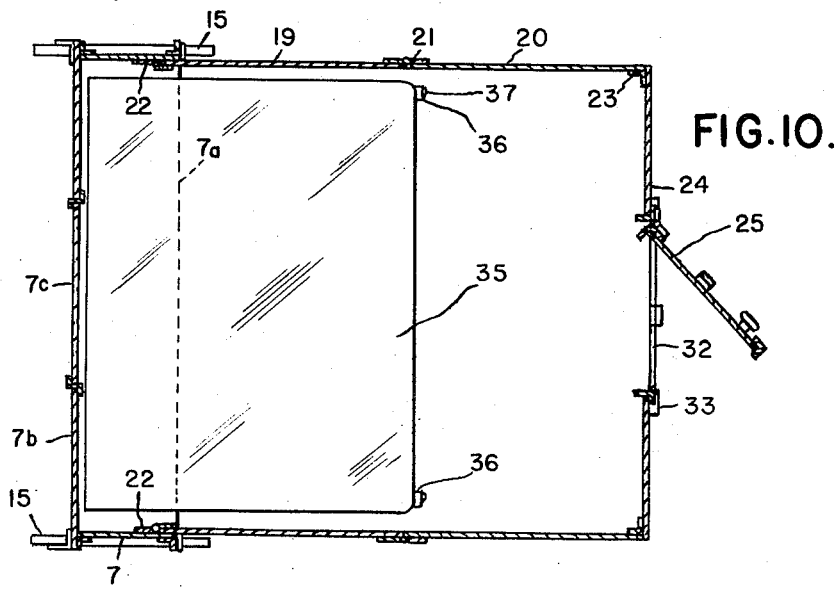
Fig. 10 is a view similar to Fig. 8 but showing the use position of a bed included in the attachment.

A bed 35 having substantially the full width of the housing 7 is vertically disposed against the housing wall 7b, when not required, and when let down for use within the expanded tent structure is supported jointly by the housing bottom 7a and by a pair of legs 36 hinged at 37 to the bed ends, so as to be collapsed along an edge of the bed when the latter is in stored position (Fig. 9). Said bed will be understood to comprise the usual rigid frame, spring, etc., not individually shown.

A table 38 and several chairs 39, all having collapsible leg constructions, may be readily accommodated in the housing 7, in addition to the collapsible tent structure.

The described attachment is quickly applicable to any motor vehicle, and may be quickly expanded to use position or retracted into its housing with little exertion. To a large extent, it affords the advantages of a camping trailer, but is far less costly, much more conveniently stored, and adds only trivially to the parking space required by a motor vericle. Furthermore, the attachment puts no heavy stresses on a motor vehicle, as does a camping trailer, and avoids material interference with maneuverability of such vehicle or safety of travel. It is a desirable and original feature of the described tent structure that its roof and sides are fully established in either their use or stored positions by a rearward or forward shifting of the wall 24. The provision made for closing the space between the walls and ground, after expanding the tent structure rearwardly, is of major importance. This avoids necessity for a raised floor and such a floor entails much heavier and sturdier legs, and more of them, than are necessary for the construction disclosed. Avoidance of a raised floor also permits of ample head room without requiring a roof so high as to constitute a travel risk.

What we claim is:

1. In a collapsible tent structure, the combination with a roofed housing having an open rear end, of an open-bottomed structure forwardly collapsible into and rearwardly expansible from said housing through said end and comprising side walls, a rear wall and a roof, the side walls being each formed by a plurality of substantially rectangular panels, having adjoined substantially vertical margins, means hingedly joining said margins of the panels of each side wall, means hinging the forward margins of the side walls upon and within the housing to swing on substantially vertical axes, means hinging the rear margins of said side walls to said rear wall to swing on substantially vertical axes, said roof being formed of readily foldable sheet material, means securing said roof to the housing roof and to the upper margins of said rear wall and panels, whereby said structure in collapsing effects a predetermined folding of the foldable roof, and an element interconnecting the side walls in an expanded position of said structure and locking such walls against collapse.

2. In a collapsible tent structure as set forth in claim 1, a flexible skirt attached to the lower margins of said panels and rear wall to extend downwardly therefrom.

3. In a collapsible tent structure as set forth in claim 1, a flexible skirt attached to the lower margins of said panels and rear wall to extend downwardly therefrom, and means interiorly carried by said panels and rear wall to support the skirt in a raised position lapping the panels and rear wall.

4. In a collapsible tent structure as set forth in claim 1, a pair of elongated rods pivotally mounted on the housing exteriorly of and at opposite sides thereof and adjustable to and from a diagonal relation to the lower corners of the open end of the housing to retain the collapsed tent structure within the housing, and means carried by said rear wall for detachably securing said rods in said diagonal relation.

5. A collapsible tent structure as set forth in claim 1, said element being upwardly bowed from end to end and detachably engaging the side walls at their upper margins, and having supporting engagement with the roof.

ARTHUR G. SHERMAN.
ARTHUR G. SHERMAN, Jr.
GEORGE H. SHERMAN.

REFERENCES CITED

The following references are of record in the file of this patent:

UNITED STATES PATENTS

| Number | Name | Date |
|---|---|---|
| 467,423 | Merritt | Jan. 19, 1892 |
| 1,427,749 | Leech | Aug. 29, 1922 |
| 1,853,608 | Gundry | Apr. 12, 1932 |
| 1,897,094 | Wilson | Feb. 14, 1933 |
| 1,917,824 | Burns | July 11, 1933 |
| 1,971,977 | Erickson | Aug. 28, 1934 |
| 2,009,051 | King | July 23, 1935 |
| 2,065,415 | Aderholtz | Dec. 22, 1936 |
| 2,127,580 | Bartholowsky | Aug. 23, 1938 |
| 2,152,713 | Stewart | Apr. 4, 1939 |
| 2,180,333 | Boggia | Nov. 21, 1939 |

FOREIGN PATENTS

| Number | Country | Date |
|---|---|---|
| 432,367 | Great Britain | July 25, 1935 |
| 447,927 | Great Britain | May 28, 1936 |